United States Patent [19]
Blackborow et al.

[11] Patent Number: 5,663,243
[45] Date of Patent: Sep. 2, 1997

[54] SUBSTITUTED AZO-DICARBONYLO DERIVATIVES

[75] Inventors: John Richard Blackborow, Edinburgh; Philip Kenneth Gordon Hodgson, Surrey, both of United Kingdom

[73] Assignee: BP Chemicals Limited, London, United Kingdom

[21] Appl. No.: 600,035

[22] Filed: Feb. 12, 1996

[30] Foreign Application Priority Data

Feb. 21, 1995 [GB] United Kingdom ............... 9503380

[51] Int. Cl.$^6$ .................................................. C08F 8/30
[52] U.S. Cl. ....................... 505/333.7; 525/375; 525/376
[58] Field of Search .............................. 525/333.7

[56] References Cited

U.S. PATENT DOCUMENTS 4,703,073 10/1987 Winter et al. ............................... 524/99

FOREIGN PATENT DOCUMENTS 2342929  3/1974  Germany .

OTHER PUBLICATIONS

Tetrahedron Letters, vol. 30, No. 49, pp. 6903–6906, 1989 "Reactions of Triazolinediones With Cis–Alkenes, A Highly Regioselective Ene Reaction" by Yiannis Elemes et al.

J. Org. Chem. vol. 41, No. 22, 1976, pp. 3614–1619, "Stereochemistry of an Ene Reaction of Dimethyl Azodicarboxylate" by L.M. Stephenson et al.

Tetrahedron Letters, vol. 31, No. 40, pp. 5775–5778, 1990— "Reactions of Triazolinedions with Alkenes. A Remarkable Geminal Selectivity" by Michael Organopoulos et al.

Tetrahedron Letters, vol. 29, No. 23, pp. 2769–2772, 1988— "Reaction of 4–Phenyl–1,2,4–Triazoline–3,5–Dione With Substituted Idenes" by Ioulia Smonou et al.

J. Chem. Soc. Perkin Trans. II 1989, pp. 1671–1675, Gerard Jenner et al., "Piezxochemical Interpretation of (C...H...X) Hydrogen Transfer in Ene Reactions".

Communications to the Editor Chemistry & Industry, 1 Feb. 1993 pp. 94–95 "Ene reactions of Jojoba Oil with 4–phenyl–1,2,4–triazoline–3,5–dione and diethyl azodicarboxylate" by Jill F. McLellan et al.

J. Am. Chem. Soc., (1990), 112, 3607–3614, "Intermediates in the Ene Reactions of Singlet Oxygen and N–Phenyl–1, 2,4–triazoline–3,5–dione with Olefins" by M. Orfanopoulos et al.

Primary Examiner—Bernard Lipman
Attorney, Agent, or Firm—Brooks Haidt Haffner & Delahunty

[57] ABSTRACT

This invention relates to novel azo-dicarbonylo derivatives of a C3–C4 olefin polymers of the formula

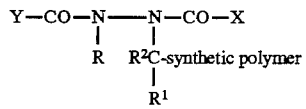

These can be prepared by reacting an ene compound such as a polypropylene or a polybutene, especially those with a vinylidene group, with an enophile such as X—CO—N=N—CO—Y. The resultant products can be used either as such or after further functionalization with eg polyamines as an additive for fuels and lubricants.

19 Claims, No Drawings

SUBSTITUTED AZO-DICARBONYLO DERIVATIVES

The present invention relates to novel azo-dicarbonylo derivatives and the use thereof either as such or after further reaction as additives for lubricants and fuels.

It is well known in the art to produce additives for fuels and lubricants from substituted poly(iso)butenes and polypropylenes. Many of these additives are made from eg poly(iso)butenyl succinic anhydrides (hereafter "PIBSA"s) derived by the reaction between a so called "ENE" eg poly(iso)butene (hereafter "PIB") and a so called "ENOPHILE", usually maleic anhydride (hereafter "MA"). ENE reactions with polymers are not that common, the maleinisation reaction being the only one which is commercially carried out. This reaction between the PIB and MA may be carried out either thermally without the use of any chlorine or other chlorinated intermediates or can be carried out using a chlorine assisted reaction. The reaction of PIB and MA to produce PIBSA is carried out under relatively severe conditions eg at temperatures above 200° C. for a duration of 2 to 20 hours and often results in the loss of significant quantities of MA as undesirable resin impurities which have to be removed by a purification step before the product can be used; moreover, in such reactions the conversions of PIB is usually low eg between 50% and 90% and many unwanted side products are produced. The purification steps needed are arduous and expensive and can lead to a resin disposal problem. Chlorine, an environmentally undesirable product, is often present in the PIBSAs so produced. In the chlorine-free, thermal route conversions of MA with respect to the PIB are often between 58 and 76%, which leaves behind a high percentage of unreacted PIB. Similarly corresponding derivatives from polypropylene have also been produced but such products encounter similar problems to PIBSA and the purified products are used for similar purposes.

The reaction of ENEs in general with ENOPHILEs such a maleic anhydride has been well investigated. It is also established that certain industrially unconventional ENO-PHILEs can react at high reaction rates with low molecular weight olefins. However, no such reactions of unusual ENOPHILEs has been carried out using relatively high molecular weight synthetic polymers as ENEs.

It has now been found that intermediates suitable for use either as such or after conversion to relevant derivatives as additives for lubricants and fuels can be produced by a process in which the above problems are substantially mitigated and in which conversion of high molecular weight ENEs, which are synthetic polymers, to these intermediates are substantially improved. It has also been found that by a careful choice of specific ENOPHILEs for this reaction and under the appropriate reaction conditions the rates of reaction thereof with the ENEs can be substantially improved.

Accordingly, the present invention is a new compound of the general formula (I):

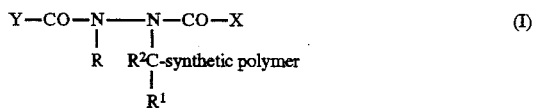

wherein X and Y each represent the same or different alkoxy, alkylamino, alkoxyalkyl amino, aminoalkyl amino, aminoalkoxy groups, or, taken together represent —O—, >N-alkyl, >N-aryl, >N-alkyl(aminoalkyl) amine, or, when X or Y is an >N-alkyl(aminoalkyl)aminoalkyl-N< group, it is such that when this grouping replaces either X or Y in formula (I) through one of its >N-functions, the resultant product having a free >N- function replaces Y or X respectively of a neighbouring compound of formula (I); and wherein when R is H, each of $R^1$ and $R^2$ also represent hydrogen atoms; and when R is a divalent alkylene group of the structure $(R^3)(R^4)C<$ such that one of the valences of the divalent alkylene group when taken together with $R^2$ replaces $R^2$ and forms a cyclic structure with the carbon atom to which $R^2$ would have been appended and the other valence of the divalent alkylene group is bonded to the nearest nitrogen atom, and the substituents $R^1$, $R^3$ and $R^4$ represent H or alkyl groups; and the synthetic polymer group (inclusive of the $C(R^1)(R^2)$ group) is derived from an oligomer or polymer of a C3–C4 olefin or a substituted derivative of said oligomer or polymer corresponding to structure (I) when R is H.

More specifically, the compound which may be formed by the process of the present invention may be represented as follows:

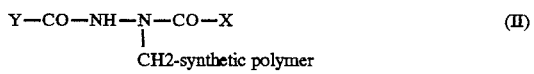

According to a further embodiment, the present invention is a process for producing compounds of formula (I) above said process comprising reacting a. an ENE compound which is an oligomer or a polymer of C3–C4 olefin with b. an ENOPHILE of the general formula (III)

wherein X and Y have the same significance as in formula (I) above at a temperature ranging from 10°–200° C., suitably from 35°–200° C.

The ENE is suitably an oligomer or polymer of propylene, butene or isobutene having a molecular weight, Mn, suitably below 5000, preferably in the range from 250–3000. Of the ENEs polypropylene and poly(iso)butenes having a vinylidene group in their structures are most preferred.

Specific examples of the ENOPHILEs are 4-phenyl-1,2,4-triazolin-3,5-dione (hereafter "PTAD"), diethyl azo-dicarboxylate (hereafter "DADC") and diisopropyl azo-dicarboxylate (hereafter "DIADC").

The reaction may proceed by hydrogen transfer to yield a product in which the ENE is still unsaturated, ie the reaction product has the structural formula (II). The reaction product may, however, be a mixture of comprising inter alia compound (II).

We now find that the reaction of an ENOPHILE such as eg PTAD with an ENE such as a PIB of high molecular weight (eg Mn=650 to 2300, as measured by GPC or VPO) can be carried out at a significantly lower temperature from eg 10° to 70° C. and is substantially complete after about 30 minutes. No chlorine, nor by-product tars or resins are formed and the conversion of PIB's can be substantially above 90%. The reaction is suitably carried out at relatively low pressures eg atmosphere pressure.

We have also found that the reaction between an ENE such as PIB and ENOPHILE such as eg DADC or DIADC is substantially faster than that observed between the same ENE, ie PIB, and MA in the normal industrial process, and proceeds without the presence of chlorine and produces substantially no by-product resin; the reaction temperature used is significantly lower, eg 100°–170° C.; and consumes substantially all of the ENOPHILE.

Another advantage of our invention is that more than one molecule of ENOPHILE can react with one molecule of an ENE such as poly(iso)butene to form adducts which contain more than one azo-dicarbonylo function per bound synthetic polymer chain; such adducts are useful in the preparation of high molecular weight polymers by oligomerisation or cross-linking.

A further most important advantage of the present invention is that when PIBs which contain no chlorine (such as the highly reactive ULTRAVIS® poly(iso)butene from BP Chemicals Ltd or GLISSOPAL® from BASF both of which have a high concentration of vinylidene groups in their respective structures) are used as the ENE, the intermediates and the chemically modified intermediates so formed do not contain any chlorine and are thus more environmentally friendly than PIBSAs made by chlorine assisted reactions. The reaction of the ENOPHILE with such reactive poly(iso) butenes also proceeds at a much faster rate than with conventional polybutenes. The poly(iso)butenes used for reaction with the ENOPHILE suitably have a molecular weight, Mn, below 5000, preferably in the range from 250–2500.

The reaction between the ENE and the ENOPHILE is suitably, though not necessarily, carried out in a solvent which dissolves both the ENOPHILE and the ENE at the reaction temperature. The solvent, when used, suitably has a boiling point at atmospheric pressure in the range from 40° C. to 200° C. Preferred solvents are trichloro- or tetrachloro-ethanes, dioxanes, dialkyl glycols, dialkyl diglycols, cyclic polyalkoxy compounds, and hydrocarbons such as benzene, toluene or the xylenes. The solvent may suitably be removed gradually during the reaction or substantially completely removed at the end of the reaction. The relatively low pressures used for the reaction (combined vapour pressure of the reactants at the temperature of reaction) enable glass or steel reactors to be used. The reaction may be carried out in air, but is suitably carried out in an atmosphere of nitrogen thereby improving reaction safety. Any commercial liquid synthetic polyolefins with unsaturation derived from C3–C4 olefins may be used as an ENE and, after the addition of the ENOPHILE and completion of the reaction, substantially no purification step is required except for the removal of the solvent.

The temperature for the reaction can depend on the ENOPHILEs used: for example, when PTAD is the ENOPHILE, a temperature in the range of 40° to 70° C. is preferred; when DADC is the ENOPHILE, a reaction temperature in the range of 100° to 200° C. is suitably used, and is preferably from 120° to 170° C.

The molar ratio of reactants ENE: ENOPHILE is suitably in the range from 1:0.5 to 1:2, preferably 1:0.7 to 1:1.6. The duration of the reaction is suitably in the range from 15 minutes to 40 hours, preferably from 15 minutes to 6 hours. The product of the addition of the ENE to the ENOPHILE, which as mentioned previously may be a mixture comprising (II) [which is hereafter called "A" for convenience].

The product A may, when required, be reacted in the same vessel with further chemical modifiers as described below:

For instance, product A, in the case of the reaction of DADC with PIB, is a bifunctional polybutenyl-azo-dicarboxylate ester (hereafter "PIBAD"), or, polybute-nyl azo-alkyl carboxylato amide (hereafter "PAACA"). These PIBADs and PAACAs can be chemically modi-fied by reaction with amines or polyamines, alcohols, water, glycols, hydroxyamines, $P_2S_5$, $P_2O_5$, alkoxy functionalised silicones, thiols, etc to give additives or additive intermediates useable in lubricants and fuels. The PIBADs can also be reacted with metal hydroxides and similar metal-oxy compounds to produce materials in which the metal is chelated by the polybutenyl-azo-dicarboxyl group.

Of specific interest is the reaction of amines with PIBADs to produce the corresponding polybutenyl-azo-diamides (hereafter "PIBADA") especially when the amination is performed with a polyamine. PIBADAs are useful additives for fuels, lubricants, detergents and/or dispersants. When polyamines are reacted with PIBADs it is, under certain conditions, possible to link together two or more PIBADs via diamido-polyamines or derivatives thereof. Such types of linked molecules, for instance succinimides, have been shown to have useful dispersancy properties and to have a high viscosity index. Although we have identified only a few specific examples of ENOPHILEs and to the intermediates formed therefrom and to the chemical modification thereof to additives useful in fuels and lubricants, the present invention is not limited to these specific examples or modifications.

The chemical modification reaction can be carried out either in the absence of any solvent or by using the same solvent as for producing A. The reaction is conveniently carried out at atmospheric pressure. At least 0.5 mole of chemical modifier per mole of product from A is used. The temperature and the time of reaction will depend upon the nature of product A and the chemical modifier reacted therewith. [The product formed by the reaction of the chemical modifier with A is hereafter called "B"].

The novel compounds of the present invention may be used as dispersants, detergents, spark aiders, antiwear agents, friction modifiers, biocides and the like. Formulations containing such compounds may contain in addition potassium, nitrogen or phosphorus compounds, fluorocarbon alcohols, sulphur compounds and the like depending upon the properties desired in the formulation.

The present invention is further illustrated with reference to the following Examples.

| Starting Materials Used and their characteristics: | | |
|---|---|---|
| ENE Compound Used | Viscosity (mm²/s) at 100° C. | =CH₂ Gps (%) by NMR |
| Ultravis ®3 (U3), Mn = 645 | 58 | 65 |
| Glissopal ®10 (G10), Mn = 930 | 201 | 74 |
| Ultravis ®70 (U70), Mn = 1960 | 1409 | 65 |
| Hyvis ®10 (H10), Mn = 935 | 235 | 2 |

| ENOPHILE Used | Colour | Other Characteristic |
|---|---|---|
| 4-phenyl-1,2,4-triazolin-3,5-dione (PTAD), Mn = 175 | Magenta | >NH Groups absent (by IR) |
| Diethylazodicarboxylate (DADC), Mn = 174 | Deep orange | >NH Groups absent (by IR); density = 1.106 |
| Diisopropylazo-dicarboxylate (DIADC), Mn = 202 | Deep orange | >NH Groups present (by IR); density = 1.03 |

EXAMPLE 1

Reaction to Produce A

To a two-necked 100 ml round-bottomed flask equipped with reflux condenser and stirrer was added 19.7 g of Glissopal® 10 (Mn=930, a reactive polybutene having vinylidene unsaturation in its structure, ex BASF) and 27.9 g of 1,1,1 -trichloro ethane; the resultant mixture was degassed by stirring under nitrogen gas. 2.36 g of 4-phenyl-1,2,4-triazolin-3,5-dione (PTAD) was added to form a red coloured mixture.

The whole red mixture was stirred with heating under nitrogen until all the PTAD dissolved; after 20 to 30 minutes at 65° C. all the red coloured mixture changed to a clear straw coloured solution.

The mixture was stripped of solvent in a rotary evaporator under vacuum at a final temperature of 140° C. for thirty minutes.

The product, a straw coloured very viscous liquid, was analysed. 16.2 g were recovered in two phials. The $^1$H NMR spectrum of the product showed the following features: NH proton (8.2 ppm); a phenyl group (multiplet, 7.5 ppm); two methylene groups attached to a polymer chain and a nitrogen atom (4.2, 4.4 ppm); a new $>C=CH_2$ group (5.08, 5.23 ppm); a new $-CH=C<$ group (5.6 ppm); and (TMS=0.0 ppm). These features agree with the spectrum of two pairs isomers of the expected one to one ene adduct.

EXAMPLE 2

Reaction to Produce A

In a 100 ml round-bottomed flask equipped with stirrer and reflux condenser was placed 9.8 g of Ultravis® 3 (a highly reactive poly(iso)butene having a high vinylidene group concentration in its structure from BP Chemicals Ltd, Mn=645) and 34.5 g of 1,1,1-trichloro ethane. Nitrogen was purged through the flask. 2.7 g of 4-phenyl-1,2,4-triazolin-3,5-dione was added to form a red coloured mixture. The flask with its contents was heated under nitrogen with vigorous stirring, from ambient temperature to 70° C. over 13 minutes; by the time the contents of the flask had reached 70° C. the red solution had changed to a light straw colour. The contents of the flask were transferred to a rotary evaporator and the 1,1,1 -trichloroethane and any other volatiles were stripped off under vacuum at a final temperature of 140° C. for 30 minutes.

The remaining straw coloured liquid was analysed. 11.1 g of material were recovered.

EXAMPLE 3

Reaction to Produce A

To a 250 ml round-bottomed flask attached to a Dean and Stark head and condenser was added 34 g of Ultravis® 70 (a highly reactive poly(iso)butene having a high concentration of vinylidene groups in its structure, from BP Chemicals Ltd, Mn=1960), 30 ml of 1,4-dioxane and 20 ml of dichloromethane; the whole was stirred under nitrogen until the contents of the flask appeared homogeneous. 3.01 g of 4 phenyl-1,2,4-triazoline-3,5-dione (PTAD) were added and the contents of the flask stirred and heated under nitrogen to form a red coloured mixture. The dichloromethane was distilled over at between 39° and 40° C. and the red colour of the solution in the-flask changed within 30 minutes to a light straw colour. Finally the majority of the dioxane solvent was distilled off and the product in the flask transferred to a rotary evaporator. The product was stripped under vacuum at a final temperature of 150° C. for 1 hour. The $^1$H NMR spectrum of the product showed the following features: a phenyl group (multiplet, 7.5 ppm); two methylene groups attached to a polymer chain and a nitrogen atom (4.2, 4.4 ppm); a new $>C=CH_2$ group (5.08, 5.23 ppm); a new $-CH=C<$ group (5.6 ppm); and (TMS=0.0 ppm). The NH group signal was masked by the phenyl group absorbance.

An 8 g sample was put aside for an analysis and the rest (24 g) was used in Example 9 below.

EXAMPLE 4

Reaction to Produce A 71.74 g of Ultravis® 3 (a highly reactive poly(iso)butene from BP Chemicals Ltd, Mn=645) was weighed into a round-bottomed flask and 50 ml of 1,4-dioxane solvent was added. The whole was homogenised by stirring. The flask was connected to a reflux condenser and nitrogen was gently blown through the apparatus. 17.2 ml of Diethyl azo-dicarboxylate (DADC) was added from a measuring cylinder to the stirred solution which developed an orange colour. The whole content of the flask was heated to 101° C. (reflux) for 24 hours. The colour of the solution was discharged. The solvent was removed by vacuum stripping on a rotary evaporator at 135° C. for 1 hour. The weight of material recovered was 70 g.

EXAMPLE 5

Reaction to Produce A

In a 250 ml round-bottom flask 67.1 g of a sample of Glissopal® (Mn=930 by GPC) were dissolved in 50 ml of 1,1,1- trichloroethane and 11.4ml of DADC were added from a measuring cylinder to the stirred solution. The contents of the flask were degassed by streaming nitrogen gas over them.

The flask was connected to a reflux condenser and the contents were heated to ~70° C. (reflux) for eight hours under nitrogen. The solvent was removed by distillation and the remaining material heated to 120° C. for 16 hours under $N_2$. The orange colour disappeared after this time and finally the contents of the flask were stripped on a rotary evaporator at 140° C. for 1 hour to remove remaining volatile material. A clear colourless viscous liquid remained. The material weighed 65 g. The $^{13}$C NMR spectrum of this product showed the following features: Two sets of doublet carbonyl groups (156.0(d), 156.8(d) ppm); two non-equivalent $-CH_2-O-$ groups (61.5, 62.3 ppm); two methyl groups (14.2 ppm); a new ene group in the polymer chain (116.0, 141.5 ppm, cf. starting polymer at 114.5 and 143.3 ppm) and (TMS=0 ppm).

EXAMPLE 6

Reaction to Produce A 72.45 g of Ultravis® 70 (Mn=1960, by VPO) and 100 ml of 1,4-dioxane were mixed in a round-bottomed flask (250 ml) connected to a reflux condenser. Nitrogen gas was blown gently through the apparatus, and then 6.0 ml of DADC was added from a measuring cylinder to form an orange coloured solution. The flask and its contents were heated with stirring under nitrogen for 40 hours at 101° C. (reflux) under $N_2$. The orange colour totally disappeared.

The resultant solution was cooled and 100 ml of the cooled solution was removed from the flask and placed in a rotary evaporator. The solvent and other volatiles were removed under vacuum at 150° C. over three hours. 35 g of a very viscous material having an aroma of an ester were recovered from the rotary evaporator. The remaining product in the round-bottomed flask was used in Example 8 below.

EXAMPLE 7

Reaction to Produce A

To a round-bottomed flask fitted with a reflux condenser was added 69 g of Hyvis® 10 (a polybutene from BP Chemicals Ltd, Mn=936 by VPO) and 60 ml of 1,4-dioxane 12 ml of DADC were added from a measuring cylinder and the stirred mixture was heated under nitrogen gas to form an orange coloured solution. The flask contents were refluxed (~101° C.) for 120 hours under nitrogen gas. After this time the orange colour of the solution had not completely disappeared. The contents of the flask were placed in a rotary evaporator and stripped under vacuum at a final temperature of 160° C. for 2 hours. The resultant material, which had the aroma of an ester, was recovered and weighed 74 g.

EXAMPLE 8

Reaction to Produce a Type "B" Product

The remainder of the reaction product and solvent from Example 6 (after removal of 100 ml of this material) was reacted in the following way. The reflux condenser used in Example 6 was repositioned so that the flask and its contents were set up for normal distillation and approximately 90% of the dioxane solvent was distilled off. 2.7 ml of triethylene tetramine was added to the flask and the distillation was continued until no more dioxane distilled over. The flask and its contents were heated to 180° C. for 1 hour and the distillate was collected. This distillate contained dioxane and ethanol. The material in the flask had, during heating, became straw coloured in appearance. 32.0 g of a very viscous straw coloured liquid were obtained from the flask which on analysis showed 3.2% by wt of nitrogen.

EXAMPLE 9

Reaction to Produce a Type "B" Product

To the stripped product from Example 3 was added 4 ml of triethylene tetramine and the mixture in a placed in a 100 ml flask under nitrogen was heated and stirred: when the temperature reacted at 220° C. it was maintained for 30 minutes whilst blending nitrogen gas through the flask at 10 ml/minute. The temperature was then raised to 235°–240° C. for 1 hour and the nitrogen sparge continued. The flask was then cooled and heptane added. The free triethylene tetramine was removed by methanol washing as a non-miscible methanol phase. The flask containing the heptane fraction (containing the Type B product) was a straw coloured solution and had a small quantity of white semi-crystalline oil. The heptane solution was separated from the oil by decantation and was evaporated under vacuum to remove heptane solvent. A yellow, very viscous liquid type B product was collected which weighed 18.2 g.

EXAMPLE 10

Reaction to Produce A

In a 100 ml three-necked round-bottomed flask 6.4 g of Ultravis® 3 (Mn=645 as measured by VPO) was mixed with 15 ml of dichloromethane and 10 ml of 1,4-dioxane, and 2.4 g of PTAD was added. The whole mixture, which was of a magenta colour, was stirred and heated to ~39° C. under nitrogen. The dichloromethane was distilled off at 39°–40° C. during which time the deep magenta colour changed to leave behind a pale straw coloured liquid. After removal of the dichloromethane, the dioxane was stripped off under vacuum at 140° C. for 1 hour. The residual pale straw coloured viscous liquid weighed 8.1 g. This was product A which contained on average more than one molecule of PTAD bound to the polybutenyl chain. The azylation ratio, defined as:

$$\frac{\text{moles of bound azodicarboxylate}}{\text{moles of polymer}}$$

was found in this case to be 1.37.

| Ex No. | ENE moles | ENOPHILE moles | A.R* | C, H, N wt % | Visc mm²/s 100° C. | Infra Red Analysis | Colour |
|---|---|---|---|---|---|---|---|
| 1 | G10 0.0212 | PTAD 0.0135 | 0.636 | 82, 13, 2.3 | — | >NH, >CO, Phenyl | Straw |
| 2 | U3 0.0152 | PTAD 0.0154 | 1.015 | 75.8, 11.3, 4.6 | — | — | Straw |
| 3 | U70 0.0173 | PTAD 0.0172 | 0.994 | 83.4, 13.4, 1.7 | — | — | Straw |
| 4 | U3 0.111 | DADC 0.1093 | 0.985 | 76.6, 12.5, 3.1 | 147 | >NH, >CO | Colourless |
| 5 | G10 0.0722 | DADC 0.0725 | 1.004 | 79, 12.9, 2.3 | 388 | | Colourless |
| 6 | U70 0.0370 | DADC 0.0381 | 1.03 | 82.5, 13.7, 1.1 | 1473 | — | Colourless |
| 7 | H10 0.0738 | DADC 0.0763 | 1.03 | —, —, — | >250 | — | Light Yellow |
| 10 | U3 0.010 | PTAD 0.0137 | 1.37 | 77.3, 11.1, 6.5 | — | — | Straw |

*represents Azylation Ratio
— represents not determined

EXAMPLE 11

Glissopal® polybutene (Mn 1000, 491.6 g) and diisopropyl azo-dicarboxylate (92.7 g, ex Dynamit Nobel) were mixed with 1,4-dioxane (450 ml) in a three-necked flask equipped with a mechanical stirrer, reflux condenser and thermocouple temperature controller. The stirred solution under cover of nitrogen was heated to 110° C. for 72 hours. The solvent was then removed under partial vacuum at 120° C. The temperature increased to 180° C. and the product was stripped under full vacuum for 90 minutes.

Analysis of the product by spectroscopic techniques showed that over 90% of the vinylidene groups in the starting polybutene had disappeared and that the spectrum of the product was entirely consistent with a one to one ene adduct of a polybutene and diisopropyl azo-dicarboxylate. For example, the $^{13}$C NMR spectrum of the product showed the following features: Two. non-equivalent carbonyl carbon peaks (155.7, 155.4 ppm); two non-equivalent tertiary carbon atoms >CH—O— (69.5, 70.2 ppm); four methyl carbon atoms (22 ppm); a methylene carbon atom attached to a polymer chain and a nitrogen atom (49 ppm); a new ene group in the polymer chain (116, 141.5 ppm, cf. starting polymer at (144.5, 143.3 ppm)); and (TMS=0 ppm). The viscosity of the product was 435 mm$^2$/s at 100° C. Elemental analysis of the product gave the following results:

C=79.8%, H=13.2%, N=2.2%, and O=5.0%.

The calculated value for a one to one adduct the elemental analysis was:

C=79.8%, H=13.1%, N=2.2% and O=5.1% thereby confirming the structure assigned to the product.

This product was designated "Material D".

EXAMPLE 12

A commercial gasoline additive formulation containing about a third each by weight of Material D from Example 11, a carrier and a solvent was used as a dispersant component. The additive was added to a standard fuel (Co-ordinating European Council for Refernce Fuels (hereafter, "CEC RF") 83-A-91) and run in a Mercedes-Benz M102E Deposit Fuel Test (CEC F-05-T-92). The amount of additive present was 800 ppm v/v in the fuel. The average valve face and tulip deposit weight after the test was found to be 132 mg and a merit rating on the ITV scale (a standard scale specific to Mercedes-Benz engines using the CEC RF Test) of 8.3 was obtained. The average valve face and tulip deposit weight after testing the base fuel in the absence of the additive was a much higher 248 mg with a merit rating of only 7.6.

EXAMPLE 13

Material D (158.9 g) from Example 11 was mixed with dimethylaminopropyl amine (200 ml) and stirred in a three-necked flask equipped with a mechanical stirrer, a thermo-couple temperature controller, a fractionating column, still head and a condenser. The stirred mixture was refluxed for 16 hours and during this period, two small aliquots (30 ml each) head fractions were withdrawn via the condenser. Both these fractions were found to contain isopropanol and diisopropyl ether diluted in dimethylaminoparopyl amine. After the reaction was completed, excess dimethyaminopropyl amine and other volatiles were removed from the reaction mixture by vacuum stripping in a Buchi evaporator.

The residue was then cooled and the cooled product from the evaporator was analysed by spectroscopy and revealed the presence of dimethylaminopropyl and isopropoxy groups. Elemental analysis of this product gave the following results:

C=79%, H=13.5%, N=4.3% and O=3.5%.

The calculated values for an adduct of azo isopropyl carboxylato dimethylaminopropyl-amide with polyisobutene was:

C=78.9%, H=13.1%, N=4.3% and O=3.7% thereby confirming the structure assigned to the product. This product was a type "B" product as defined above.

It can Be seen that the present invention has many advantages over current methods used in the art to produce intermediates and chemically modified products therefrom for use as additives in and fuels. In particular, in producing these products:

No chlorine is used.

Reactions take place at atmospheric pressure and at moderate temperatures.

No excess ENOPHILE is needed and none is wasted in by-product formation.

Reactions in certain cases are very much faster than the reactions of ENEs with maleic anhydride.

Chemical modification can be done in the same reactor as the ENE reactor.

No purification steps, apart from solvent removal, are needed for either product (A) or (B).

To produce B, the chemical modifier can be used as solvent, if required.

Bifunctionalised ENEs can be produced.

The ENE reaction is generic and can be used for many polyolefins.

One-step reaction to produce aminated products of value in final application.

We claim:

1. A new compound of the general formula (I)

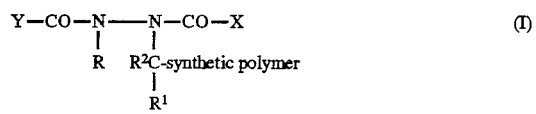

wherein X and Y each represent the same or different alkoxy, alkylamino, alkoxyalkyl amino, aminoalkyl amino, aminoalkoxy groups, or, taken together represent —O—, >N-alkyl, >N-aryl, >N-alkyl(aminoalkyl) amine, or, when X or Y is an >N-alkyl(aminoalkyl)aminoalkyl-N< group it is such that when this grouping replaces either X or Y in formula (I) through one of its >N-functions, the resultant product replaces Y or X respectively of a neighbouring compound of formula (I);

and wherein when R is H, each of R$^1$ and R$^2$ also represent hydrogen atoms; and when R is a divalent alkylene group of the structure (R$^3$)(R$^4$)C< such that one of the valences of the divalent alkylene group when taken together with R$^2$ replaces R$^2$ and forms a cyclic structure with the carbon atom to which R$^2$ would have been appended and the other valence of the divalent alkylene group is bonded to the nearest nitrogen atom, and the substituents R$^1$, R$^3$ and R$^4$ represent H or alkyl groups; and the synthetic polymer group (inclusive of the C(R$^1$)(R$^2$) group) is derived from an oligomer or polymer of a C3–C4 olefin or a substituted derivative of said oligomer or polymer corresponding to structure (I) when R is H.

2. A compound of the general formula (I) according to claim 1 wherein said compound is a compound of formula (II):

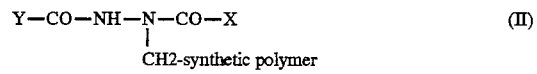

and wherein X, Y, R$^1$, R$^3$, R$^4$ and the synthetic polymer have the same meainings as in claim 1.

3. A compound according to claim 1 wherein the synthetic polymer group is derived from an oligomer or a polymer of propylene or isobutene, said compound being substantially free of chlorine.

4. A compound according to claim 1 wherein the oligomer or polymer of propylene or isobutene has a high concentration of vinylidene groups in its structure.

5. A compound according to claim 1 wherein said compound is a bifunctional polybutenyl-azo-dicarboxylate ester (hereafter "PIBAD").

6. A process for producing compounds of formula (I)

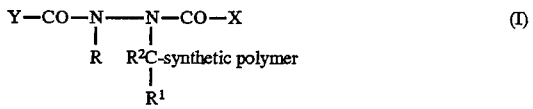

wherein
X and Y each represent the same or different alkoxy, alkylamino, alkoxyalkyl amino, aminoalkyl amino, aminoalkoxy groups, or, taken together represent —O—, >N-alkyl, >N-aryl, >N-alkyl(aminoalkyl) amine, or, when X or Y is an >N-alkyl(aminoalkyl) aminoalkyl-N< group, it is such that when this grouping replaces either X or Y in formula (I) through one of its >N-functions, the resultant product replaces Y or X respectively of a neighbouring compound of formula (I);
and wherein
when R is H, each of $R^1$ and $R^2$ also represent hydrogen atoms; and
when R is a divalent alkylene group of the structure $(R^3)(R^4)C<$ such that one of the valences of the divalent alkylene group when taken together with $R^2$ replaces $R^2$ and forms a cyclic structure with the carbon atom to which $R^2$ would have been appended and the other valence of the divalent alkylene group is bonded to the nearest nitrogen atom, and the substituents $R^1$, $R^3$ and $R^4$ represent H or alkyl groups; and
the synthetic polymer group (inclusive of the $C(R^1)(R^2)$ group) is derived from an oligomer or polymer of a C3–C4 olefin or a substituted derivative of said oligomer or polymer corresponding to structure (I) when R is H, said process comprising reacting
a. an ENE compound which is an oligomer or a polymer of C3–C4 olefinic hydrocarbon with
b. an ENOPHILE of the general formula (III)

wherein X and Y have the same significance as in formula (I) above at a temperature ranging from 10°–200° C.

7. A process according to claim 6 wherein the ENE is an oligomer or polymer of propylene, butene or isobutene.

8. A process according to claim 6 wherein the oligomer or polymer of propylene or isobutene has a high concentration of vinylidene groups in its structure.

9. A process according to claim 6 wherein the ENOPHILE is 4-phenyl-1,2,4-triazolin-3,5-dione (hereafter "PTAD"), diethyl azo-dicarboxylate (hereafter "DADC") or diisopropyl azo-dicarboxylate (hereafter "DIADC").

10. A process according to claim 6 wherein the ENE is PIB of high molecular weight (eg Mn=650 to 2300, as measured by GPC or VPO) and the ENOPHILE is PTAD, and wherein the reaction between the two is carried out at a temperature from 10° to 70° C.

11. A process according to claim 6 wherein the ENE is PIB and the ENOPHEE is DADC or DIADC, and the reaction between the two is carried out at a temperature from 100°–170° C.

12. A process according to claim 6 wherein the molar ratio of reactants ENE: ENOPHILE is in the range from 1:0.5 to 1:2.

13. A process according to claim 6 wherein the reaction between the ENE and the ENOPHILE is carried out in a solvent boiling point at atmospheric pressure in the range from 40° C. to 200° C. and which dissolves both the ENOPHILE and the ENE at the reaction temperature so as to form a product substantially free of tars and resins.

14. A process according to claim 13 wherein the solvent is selected from trichloro- or tetrachloro-ethanes, dioxanes, dialkyl glycols, dialkyl diglycols and cyclic polyalkoxy compounds, benzene, toluene and the xylenes.

15. A process according to claim 6 wherein the product of the reaction of the ENE with the ENOPHILE is a mixture of compounds comprising a compound of formula (II).

16. A process for modifying a PIBAD according to claim 5 wherein said PIBAD is reacted with a compound selected from the group consisting of: amines or polyamines; alcohols; water; glycols; hydroxyamines; phosphorus pentoxide; phosphorus pentasulphide; alkoxy functionalised silicones; thiols; metal hydroxides; and metal-oxy compounds.

17. An additive for a fuel or a lubricant comprising a modified PIBAD produced by a process according to claim 16.

18. A process for for modifying a PIBAD according to claim 5 wherein said PIBAD is reacted with a polyamine to produce the corresponding polybutenyl-azo-diamides (hereafter "PIBADA") or polybutenyl azo-alkylcarboxylato amide (hereafter "PAACA").

19. An additive for fuels or lubricants comprising a PIBADA or PAACA produced by a process according to claim 18.

* * * * *

UNITED STATES PATENT AND TRADEMARK OFFICE
CERTIFICATE OF CORRECTION

PATENT NO. : 5,663,243
DATED : September 2, 1997
INVENTOR(S) : JOHN RICHARD BLACKBOROW and
PHILIP KENNETH GORDON HODGON It is certified that error appears in the above-identified patent and that said Letters Patent is hereby corrected as shown below:

Col. 5, l. 27, should read "of isomers"

Col. 9, l. 3, delete the period (.) after the word "Two"

Col. 9, line 47, correct the spelling of "dimethylaminopropyl"

Claim 11, line 2, correct the spelling of the word "ENOPHILE"

Claim 18, line 1, strike one of the words "for"

Signed and Sealed this

Twenty-third Day of December, 1997

Attest:

BRUCE LEHMAN

Attesting Officer

Commissioner of Patents and Trademarks